UNITED STATES PATENT OFFICE 2,120,298

METHOD OF REFINING IRON AND STEEL

Herman B. Schulz, Chicago, Ill.

No Drawing. Application January 20, 1936, Serial No. 59,997

2 Claims. (Cl. 75—57)

The invention relates generally to a method of refining iron and steel and has more particular reference to the removal of precipitated inclusions by agitation with an absorbing slag-like medium to produce a metal which will be free of physical defects.

The method of the present invention has for its primary object to produce a steel which will be free of sub-surface seams, pin-hole porosity, etc., and which will have in general more perfect physical properties than steel produced heretofore, without, however, materially increasing the cost of production and without requiring the addition of other elements or expensive metallic alloys.

Another object of the invention is to provide an inexpensive but practical method for removing inclusions such as the silicates and aluminates formed principally by the silicon and aluminum additions to the molten steel for deoxidizing purposes. The method does not materially depart from standard practice and therefore has application to the production of electric furnace steels and also steels produced by the open hearth and the Bessemer process. It has long been known that certain inclusions such as silicates and aluminates are formed in the molten steel by the addition of the deoxidizers, and that these inclusions were primarily responsible for certain physical defects in the resultant steel. All prior attempts in maintaining cleanliness in the final product were based on the practice of reducing the oxygen content of the steel as much as possible by known steel making methods before adding the final deoxidizers. The theory behind this practice was that since silicon and aluminum combined with oxygen to form inclusions responsible for certain defects, then the oxygen in the steel which makes such inclusions possible should be reduced before the addition of the final deoxidizers. For examples of prior attempts above described, mention may be made of the open hearth practice in which the oxygen content of the steel is maintained at a minimum for killed steels; the practice of reducing the oxygen content in electric furnace steels by reducing slags; and the original Perrin process in which the steel is treated with a siliceous deoxidizing slag to lower the dissolved oxygen content before adding the final aluminum.

As distinguished from prior practice, the present invention does not attempt to limit the formation of inclusions in the molten steel but contemplates the removal of said inclusions by subsequent agitation and stirring with an absorbing medium such as a slag of some kind. For example, in electric furnaces it has been found that the slag is a good absorbing medium for the particles formed when silicon, aluminum and zirconium, are added as the final deoxidizers. However, it is of prime importance in rendering the electric furnace slag efficacious in absorbing the inclusions to provide for intimate contact between the slag and molten steel. This may be accomplished by any desired method, provided the slag and steel are intimately mixed so as to bring the slag into association with the inclusions in the steel. It has been found that readling of the steel, or which may be described as lip pouring, has been very satisfactory in effecting a sufficiently intimate contact between slag and steel for removing coarse inclusions. This consists in pouring the slag and the molten steel after the final deoxidizers have been added thereto over the lip of a transfer ladle to a second ladle. As a result of the pouring, the slag is brought into contact with the silicates and aluminates in the molten steel which are thereby absorbed by the slag, producing a cleansing effect on the steel.

Another method may consist in stirring the steel after the addition of the final deoxidizers and while the steel is still in the furnace.

For purposes of description, the various steps in the production of a steel in accordance with the invention will be given. A steel known in the trade as S. A. E. 4615 is used in substantial quantities for case-hardened articles, such as gears, shafts and roller bearing races where it is desired to combine interior strength and toughness with high surface hardness for wear resistance. In many of these applications it is highly important that the steel be especially free from non-metallic inclusion and of homogeneous structure, all in the interest of uniformity in quality, strength and long service life in the finished product. S. A. E. 4615 steel is produced of the following chemical specification:

| | Per cent |
|---|---|
| Carbon | 0.10 –0.20 |
| Manganese | 0.40 –0.70 |
| Phosphorous, maximum | 0.040 |
| Sulphur, maximum | 0.050 |
| Nickel | 1.65 –2.00 |
| Molybdenum | 0.20 –0.30 |

Steels to this specification are produced in open hearth and also in the electric furnace, the method consisting in first melting down the charge. The heat is finished in the usual manner and the furnace is then tapped into a transfer ladle and the final deoxidizers such as silicon, zirconium and aluminum are added to the ladle. The molten steel is then reladled, which consists in pouring the contents over the lip of said transfer ladle to a second ladle, the lip pouring having the effect of enabling the slag to absorb precipitated inclusions, such as silicates and aluminates. Steel produced as above described is free from physical defects and has improved microscopic cleanliness and homogeneity. Therefore the yield of clean steel per ingot is materially increased. The present method is relatively simple and does not require the production of a special slag but use is made of the slag resulting from the production of the steel.

What is claimed is:

1. The process of making iron or steel which consists in producing in a suitable furnace a molten bath of iron or steel, said molten bath of iron or steel being accompanied by the production of the usual slag tapping the furnace into a transfer ladle, adding the final deoxidizers such as silicon, zirconium and aluminum, and then reladling the charge of molten iron or steel by pouring the contents over the lip of the transfer ladle to a second ladle, whereby contact between the slag and molten iron or steel takes place for absorbing the inclusions in the iron or steel formed by the addition of said final deoxidizers.

2. The process of making iron or steel which consists in producing in a suitable furnace a molten bath of iron or steel, said molten bath of iron or steel being accompanied by the production of the usual slag, tapping said furnace to a ladle, adding the final deoxidizers such as silicon, zirconium and aluminum to said molten bath while in the ladle and in the presence of said slag, and then agitating the molten bath of iron or steel whereby intimate contact between said slag and the molten bath takes place for absorbing the inclusions in the molten iron or steel formed by the addition of said final deoxidizers.

HERMAN B. SCHULZ.